(12) United States Patent
Davis et al.

(10) Patent No.: US 12,530,596 B2
(45) Date of Patent: Jan. 20, 2026

(54) ADAPTIVE USAGE OF STORAGE RESOURCES USING DATA SOURCE MODELS AND DATA SOURCE REPRESENTATIONS

(71) Applicant: EMC IP Holding Company LLC, Hopkinton, MA (US)

(72) Inventors: Sashka T. Davis, Vienna, VA (US); Naveen Sunkavally, Cary, NC (US); Zulfikar A. Ramzan, Saratoga, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 382 days.

(21) Appl. No.: 16/671,791

(22) Filed: Nov. 1, 2019

(65) Prior Publication Data
US 2021/0133211 A1 May 6, 2021

(51) Int. Cl.
*G06N 5/01* (2023.01)
*G06F 16/2455* (2019.01)
*G06F 16/28* (2019.01)
*G06N 7/01* (2023.01)
*G06N 20/00* (2019.01)

(52) U.S. Cl.
CPC ......... *G06N 5/01* (2023.01); *G06F 16/24553* (2019.01); *G06F 16/285* (2019.01); *G06N 7/01* (2023.01); *G06N 20/00* (2019.01)

(58) Field of Classification Search
CPC ........ G06N 5/003; G06N 20/00; G06N 20/20; G06N 7/005; G06F 16/285; G06F 16/24553
See application file for complete search history.

(56) References Cited

U.S. PATENT DOCUMENTS

2013/0066843 A1\* 3/2013 Nair .................. G06F 16/16
707/694
2013/0318305 A1\* 11/2013 Bivens ............... G06F 12/121
711/134

(Continued)

OTHER PUBLICATIONS

Tekumalla et al., Copula-HDP-HMM: Non-parametric Modeling of Temporal Multivariate Data for I/O Efficient Bulk Cache Preloading, Proceedings of the 2016 SIAM International Conference on Data Mining (SDM), 2016, pp. 774-782 (Year: 2016).\*

(Continued)

*Primary Examiner* — Daniel T Pellett
(74) *Attorney, Agent, or Firm* — Ryan, Mason & Lewis, LLP

(57) ABSTRACT

Techniques are provided for adaptive usage of storage resources using data source models and data source representations generated using the data source models. One method comprises obtaining sampled data generated by sampling source data from a data source; fitting a data model to the sampled data to obtain a representation of the sampled data; obtaining a classification of the sampled data into one of multiple predefined retention models; and adapting a usage of one or more storage resources that store the retained data based on the representation and the classification. The adaptive storage resource usage may comprise, for example: (i) varying a data retention model based on an age of the sampled data; (ii) evicting cache data based on the representation; (iii) moving the retained data to a different storage tier; and (iv) determining an amount of time to store the retained data.

20 Claims, 6 Drawing Sheets

(56) References Cited

U.S. PATENT DOCUMENTS

| | | | | |
|---|---|---|---|---|
| 2015/0242133 | A1* | 8/2015 | Smith | G06F 3/0632 |
| | | | | 711/114 |
| 2016/0085469 | A1* | 3/2016 | Cherubini | G06F 11/3442 |
| | | | | 711/114 |
| 2016/0098455 | A1* | 4/2016 | Curtin | H04L 65/80 |
| | | | | 707/738 |
| 2017/0060769 | A1* | 3/2017 | Wires | G06F 12/1018 |
| 2017/0308482 | A1* | 10/2017 | Alatorre | G06F 12/126 |
| 2020/0134198 | A1* | 4/2020 | Rudrabhatla | G06F 18/24 |

OTHER PUBLICATIONS

Sithole et al., Cache performance models for quality of service compliance in storage clouds, Journal of Cloud Computing: Advances, Systems and Applications 2013, 2:1, published Jan. 10, 2013, 24 pages (Year: 2013).*

Wajahat et al., Distribution Fitting and Performance Modeling for Storage Traces, 2019 IEEE 27th International Symposium on Modeling, Analysis, and Simulation of Computer and Telecommunication Systems (MASCOTS), Oct. 21-25, 2019, pp. 138-151 ( Year: 2019).*

Bryan Willman, Data Retention Best Practices, Techfino, Sep. 26, 2016. 12 pages.

Jun Li et al. Managing Data Retention Policies at Scale, HP Laboratories, 2011, 9 pages.

Yinghao Yu, LRC: Dependency-Aware Cache Management for Data Analytics Clusters, arXiv: 1703.08280v1 [cs.DC] Mar. 24, 2017, 9 pages.

Ehcache, Cache Eviction Algorithms, https://www.ehcache.org/documentation/2.8/apis/cache-eviction-algorithms.html, last accessed on Oct. 29, 2019.

* cited by examiner

ADAPTIVE USAGE OF STORAGE RESOURCES USING DATA SOURCE MODELS AND DATA SOURCE REPRESENTATIONS

FIELD

The field relates generally to information processing techniques, and more particularly, to techniques for storing and retaining data.

BACKGROUND

Smart cities, smart factories, and smart buildings are example environments in which many Internet of Things (IoT) devices and sensors produce large and often continuous streams of data. The data is often collected and processed in a centralized computing system to assess the overall state of the monitored environment.

A need exists for improved techniques for storing and retaining data in caches and other storage devices in resource-constrained environments, such as IoT edge gateway devices.

SUMMARY

In one embodiment, a method comprises sampling data from at least one data source; fitting at least one data model to the sampled data to obtain a representation of the sampled data from the at least one data source; obtaining a classification of data from the at least one data source into one of a plurality of predefined retention models; and adapting a usage of one or more storage resources that store the data from the at least one data source based at least in part on the representation and the classification.

In some embodiments, the at least one data model comprises a parametric model, a non-parametric model, a descriptive statistics model, a time series model, decision trees and an ensemble of decision trees.

In at least one embodiment, the adapting the usage of the one or more storage resources comprises one or more of (i) varying a data retention model as a function of an age of the sampled data from the at least one data source; (ii) evicting data from a cache based at least in part on the representation; (iii) moving the data to a different storage tier; and (iv) determining an amount of time to store the data.

The predefined retention models comprise, for example, a lossy retention model; a subsample retention model; and a complete retention model.

Other illustrative embodiments include, without limitation, apparatus, systems, methods and computer program products comprising processor-readable storage media.

DETAILED DESCRIPTION

Figure 1:
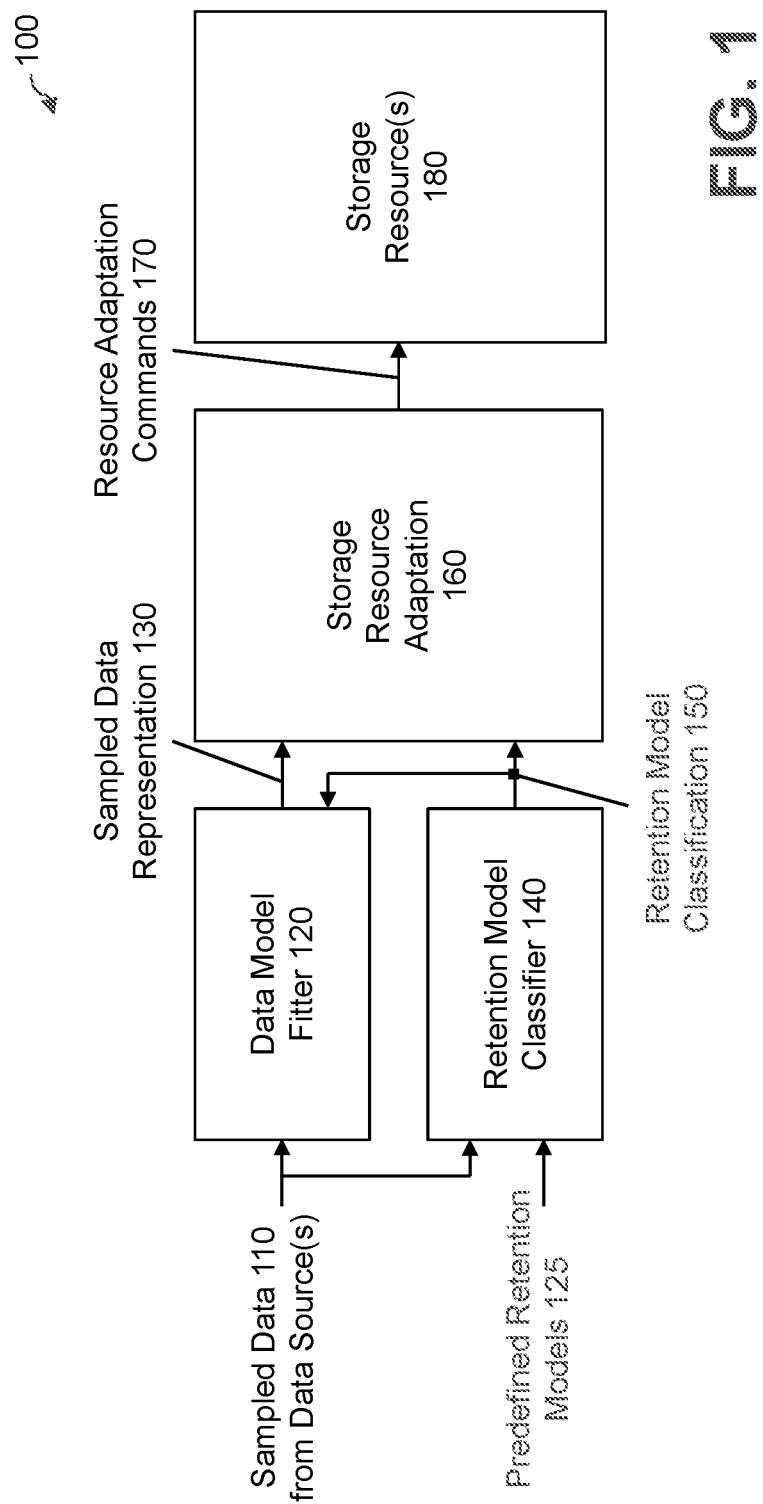
FIG. 1 illustrates an exemplary adaptive storage resource usage environment, according to an embodiment of the disclosure.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for adaptive usage of storage resources using data source models and data source representations generated using the data source models.

In one or more embodiments, techniques are provided for deriving data models to represent the data to be used, for example, for, caching, storage retention and other movements of the data obtained, for example, from sensors and other IoT devices that produce numerical data. In some embodiments, techniques are provided for deriving data models to represent the data in resource-constrained environments, such as IoT edge gateways.

In a smart building or a smart factory, there are often tens or hundreds of thousands of sensors generating data in real-time. The data can be sent to a centralized computer system for processing, analysis, storage, and retention. Some devices will be critical while other devices might not. The degree of data retention required for data from different sources can depend on, for example, device criticality, device location, device type, assigned policy and/or priority, and data age.

If a sensor monitors the temperature of a nuclear reactor, for example, then the data generated will likely have to be kept and retained without loss for a long time. However, a sensor monitoring the temperature of a storage room in an office building may be of less importance and, in this case, retention of data over any period of time or without loss might be unnecessary. These examples are two extreme cases. In other circumstances, it might be important to sample all temperature readings from all sensors in a building, but the complete data can be overwhelming and a data model to represent the data, discussed further below, although lossy, can be better suited to assess, for example, the overall efficiency or configuration of a heating, ventilation and air conditioning system (for example).

In other cases, it might be beneficial to retain a subsample of the generated data, together with a data model that describes or otherwise represents the generated data, to understand the changes and variations, yet the entire sequence of data readings can be wasteful to store and retrieve. Finally, for some sensors based on their sensor type, a summary of descriptive statistics might be all that is required to keep in memory or retain. The decision about how much information and data should be retained might vary over time as location of a sensor might change and/or the criticality of the process monitored by a given sensor can vary as well.

In one or more embodiments, a family of techniques are provided for adaptive caching, storage, storage tiering and retention of data that is generated by a large number of independent devices. In some embodiments, the disclosed adaptive techniques comprise two components, namely, a data modeling component and a retention modeling component. Data modeling uses device data to derive a succinct description (e.g., a statistical model) that can be used for analysis, storage, and retention.

Data Modeling for a Single IoT Device

Consider a single device that produces real-time data. Sensors collect data about various processes that they monitor. Many processes (even in nature) have an underlying distribution that can be used as a generative model to describe the values read by the sensor with different degrees of precision and fit. For example, environmental data, such as temperature and barometric pressure collected over the course of a day, or a week, is not random and usually behaves like a Normal distribution.

In some embodiments, the disclosed adaptive storage usage techniques sample the data and use the sampled data to fit a known parametric model. Once the model is fit to the data, a probability density function together with the parameters that are a best fit for the data have been identified. Different models are appropriate for devices of different roles and importance. Suppose that an IoT device is of high importance or criticality and the data is sampled at a high rate. In this case, it might be necessary or required to keep all data, for example, as a time series.

All sensors, however, may not be critical and retention of complete historical data may not be important. In such cases, some degree of loss can be allowed and a subsample of the data can be retained together with a description of the model, as discussed below.

FIG. 1 illustrates an exemplary adaptive storage resource usage environment 100, according to an embodiment of the disclosure. As shown in FIG. 1, sampled data 110 from one or more data source(s) is applied to a data model fitter 120 that fits at least one predefined data model to the sampled data 110 to obtain a representation 130 of the sampled data. In some embodiments, the data model fitter 120 uses one or more statistical tests on the sampled data 110 to decide which distribution or other representation fits the data best, as discussed further below.

In one or more embodiments, a retention model classifier 140 processes at least some of the sampled data 110 and determines a retention model classification 150 using a number of predefined retention models 125. It is noted that the data importance classification can be performed, for example, by a human user, such as a domain expert, typically when the particular data source (or data source class or data source type) is added to the overall system, and the retention model classification 150 can be adjusted, as needed. In some embodiments, the retention model classification 150 determines a complexity of the data model that is used by the data model fitter 120 to represent the data for the at least one data source and a retention model for the sampled data from the at least one data source, as discussed further below.

As discussed further below, in at least some embodiments, the predefined retention models 125 comprise: a lossy retention model that maintains a type of a probability density function used to represent the sampled data 110, one or more parameters of the probability density function and one or more summary statistics; a subsample retention model that maintains the information maintained by the lossy model, as well as a time interval, summary statistics and a subsample of the data from the data source; and a complete retention model that maintains the information maintained by the subsample retention model, as well as the actual data from the data source.

A storage resource adaptation module 160 processes the sampled data representation 130 and the retention model classification 150 and generates one or more resource adaptation commands 170 to adapt a usage of one or more storage resources 180 that store the data from the data source.

Data Models

Figure 2:
FIG. 2 illustrates an exemplary data model toolkit that comprises a number of exemplary data models that can be employed by the data model fitter of FIG. 1 to represent the data, according to one or more embodiments.

FIG. 2 illustrates an exemplary data model toolkit 200 that comprises a number of exemplary data models 210-1 through 210-n that can be employed by the data model fitter 120 to represent the data, according to one or more embodiments. As discussed hereinafter, the exemplary data models 210 represent the data using one or more predefined distributions, or distribution-free representations, with various degrees of loss that are useful for different use cases and scenarios. Parametric models can be inferred for data that fits one of the known standard distributions, which is a common case for many natural processes and also for processes in many industrial settings. When a simple distribution might not fit well for more complex data, then a non-parametric model can be used, such as a Gaussian Mixture model (GMM; or Gaussian process).

As shown in FIG. 2, the exemplary data model toolkit 200 comprises a parametric model 210-1; a non-parametric model 210-2; a descriptive statistics model 210-3; a time series model 210-4; decision trees 210-5 and an ensemble of decision trees 210-n Parametric Model 210-1

A parametric model 210-1 describes the data using a probability density function (PDF) and parameters of the PDF.

i. Some embodiments use an Expectation Maximization (EM) algorithm and the data to learn a known parametric model 210-1 (such as, Normal distributions (including multi-variate normal distributions), Poisson distributions, Gamma distributions, and Binomial distributions, as discussed further below); and ii. Some embodiments of the disclosure use statistical tests such as p-value test, Akaike, or Bayesian Information criterion, to decide which distribution fits the data best.

Some of the known distributions that can be learned for the parametric model 210-1 comprise, for example:

1) Normal Distribution:
   known to describe many natural phenomena; and
   the distribution is described by two parameters, namely, the mean and the standard deviation of the distribution.

2) Poisson Distribution:
   member of the exponential family of distributions;
   the distribution is described by a single parameter; and
   known to model arrival times of events.

3) Gamma Distribution:
   suitable for modeling continuous data or substantially continuous data (e.g., rainfall and signal power fading); and
   the distribution is typically described by two parameters (k, theta).

4) Binomial Distribution:
   suitable for modeling Bernoulli process (e.g., sequence of success/failure events); and
   the distribution is typically described by one parameter (p).

Non-Parametric Model 210-2

One or more aspects of the invention recognize that non-parametric models 210-2 are also a powerful statistical modeling tool. These models are used for at least three distinct scenarios.

a. Modeling Complex Data with Gaussian Process

In some cases, the data can be complex and a single distribution does not describe the data well. In this case, GMMs, which are powerful statistical tools, are used to describe arbitrarily complex data. Geometrically speaking, GMMs describe clusters of data of various sizes, where each cluster has a different ellipsoid shape. The expectation-maximization (EM) algorithm can be used to fit the GMM model. The number of components are hypothesized to be a small constant. The GMM model is fit with 1, 2, ..., k<10, components, and then a Bayesian Information Criterion (BIC) is used to decide which model fits the data best.

For example, using a GMM with a small number of components:
   a. Use EM algorithm to fit the GMM with k components, for k=1, ..., 10; and
   b. Use an information criterion, such as an Akaike Information Criterion (AIC) or a BIC, to choose the number of components in the mixture that best describes the data.

The non-parametric model 210-2 of the data is described by the mixture coefficients and the mean and variance of each Gaussian component.

b. Non-Parametric GMM-Like Models that Capture Temporal Variance

Suppose that the distribution of data varies over time, and it is expected to vary over time. For example, an IoT temperature sensor produces readings during office hours that is modeled by a Normal distribution with one set of parameters and a Normal distribution with a different set of parameters outside of office hours because the set points controlling the temperature are different. In this case, there are two distinct distributions and the values generated by the source data device belong to one or the other distribution depending on the time of day. Thus, the procedure described above in the section entitled "Modeling Complex Data with Gaussian Process" can be employed to describe the data for each distinct time period.

1) The above-described procedure for using a GMM with a small number of components is used to find the number of components and the parameters of the Normal distribution for each distinct time period (referred to herein as MODEL-1);
2) using supervisor knowledge, the sampled data 110 is split into N sets based on the time stamps. For example, a two-set split of the data (N=2), is appropriate for a two-shift scenario, and a three-set split of the data (N=3), is appropriate for a three-shift scenario. A Normal distribution is fit for each set separately and this collection of Normal distributions is referred to herein as MODEL-2. In this case, each component is associated with a time interval. For a three-set distribution, for example, the time interval split for a 24-hour period can be 0-8; 8-16; 16-24. Likewise, for a two-set distribution, the time interval split can be working-hours/off-working-hours. The intervals can also be learned, as would be apparent to a person of ordinary skill in the art.
3) To choose between MODEL-1 and MODEL-2, the probability of the observed data given MODEL-1 or MODEL-2 is estimated, and the model that maximizes the probability of the observed data is selected.

c. Kernel Density Estimation Procedures

In a further variation, Kernel Density Estimation procedures can be used to fit arbitrary probability distributions, in a known manner. Kernel Density estimations are often considered a "distribution-free" model of data.

Descriptive Statistics Model 210-3

A descriptive statistics model 210-3 can be used in further variations to represent the data, as follows:
   1) record summary statistics of the data, such as min, max, median, lower and upper quartiles;
   2) obtain the mean and standard deviation of the sample; and
   3) obtain time stamps of the first and last value recorded.

Time Series Model 210-4

In yet another variation, a time series model 210-4 can be used to represent the data, as follows:
   time series of the data can be collected and substantially all readings and timestamps can be kept. In this case, there is no data loss and complete information about the process is maintained.

Decision Trees 210-5 and Ensembles of Decision Trees 210-$n$

In another implementation, a decision trees model 210-5 or an ensemble of decision trees model 210-$n$ can be used to represent the data. Generally, decision trees are parameterized using labeled training data indicating whether the data is anomalous, as would be apparent to a person of ordinary skill in the art.

A decision tree is a decision tool that uses a tree-like graph or model of decisions and corresponding possible actions or consequences. A decision tree can be considered an algorithm comprising conditional control statements. Ensemble methods combine multiple decision trees to produce better predictions, relative to a single decision tree.

Distribution Drift and Model Retraining

Once a Parametric Model 210-1, a Non-Parametric Model 210-2 or Another Model 210-3 through 210-$n$ has been fit to the data, the density functions can be used to help detect distribution drift. As used herein, the term distribution drift also encompasses deviations from other distribution-free representations of the data. Distribution drift happens when the process generates data that is no longer described by the previously estimated distribution or other representation. In this case, the outliers become more frequent. A new distribution or other representation 130 (FIG. 1) can be estimated by the data model fitter 120 to describe the data using the model training mode described above to find new parameters of the distribution or other representation (or to fit a new distribution or other representation altogether).

Storage and Retention Models for Single IoT Device

In one or more embodiments, after the data model is inferred, the data used to derive the model can optionally be discarded, depending on the use case, the location, or the criticality status of the sensor that generated the data.

Figure 3:
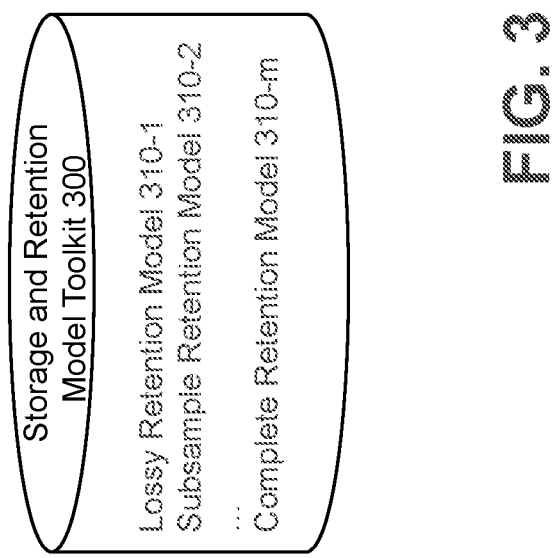
FIG. 3 illustrates an exemplary storage and retention model toolkit that comprises a number of exemplary storage and retention models that can be employed by the storage resource adaptation module to make decisions regarding usage of the storage resources, according to an embodiment of the disclosure.

As noted above, in some embodiments, the retention model classifier 140 of FIG. 1 processes at least some of the sampled data 110 and determines a retention model classification 150 using a number of predefined retention models 125. FIG. 3 illustrates an exemplary storage and retention model toolkit 300 that comprises a number of exemplary storage and retention models 310-1 through 310-$m$ that can be employed by the storage resource adaptation module 160 to make decisions regarding usage of the storage resources 180, according to an embodiment of the disclosure.

In at least some embodiments, the exemplary storage and retention models 310 comprise: a lossy retention model 310-1; a subsample retention model 310-2; and a complete retention model 310-*m*. Generally, as discussed hereinafter, the lossy retention model 310-1 is appropriate, for example, when the sensors are of very low criticality and while some information about the process that they monitor is necessary, storing the complete set of data is expensive and wasteful. The subsample retention model 310-2 can be used, for example, for sensors and processes of higher importance and criticality. This model retains substantially everything that the lossy retention model produces, and in addition, a subsample of the data is kept, as discussed further below. The complete retention model 310-*m* retains the complete time series, without any substantial loss, in addition to the information kept by the other two models.

Lossy Retention Model 310-1

In at least some embodiments of the disclosure, the lossy retention model 310-1 retains only a description of the probability density function, the parameters of the distribution and one or more exemplary summary statistics, as follows:
a. distribution (type of the PDF and the parameters of the distribution);
b. time interval during which the PDF is derived; and
c. descriptive statistics.

Among other benefits, the lossy retention model 310-1 is space efficient, as a vast amount of data is represented only as a few numbers and a description of a function.

Subsample Retention Model 310-2

In at least some embodiments of the disclosure, the subsample retention model 310-2 retains a sample of the real data as well the PDF information retained by the lossy model, as follows:
a. distribution (type of PDF and the parameters of the PDF)
b. time interval during which the PDF is derived;
c. descriptive statistics; and
d. a subsample obtained at random of a certain size, depending on the available storage or as a fixed fraction of the original set of collected observations.

Among other benefits, the subsample retention model 310-2 has various degrees of retention. The degrees of retention can be determined based on, for example, the size of the subsample of the data to be kept. The size of the subsample governs the sampling frequency. The subsample retention model 310-2 can be appropriate, for example, for aging data where a smaller and smaller subsample is kept over time.

Complete Retention Model 310-*m*

In at least some embodiments of the disclosure, the complete retention model 310-*m* retains substantially all of the measurement data, the timestamps, and the distributional models.

Retention Model Selection Based on Priority and Criticality for a Single IoT Device As noted above, in some embodiments, the retention model classifier 140 of FIG. 1 processes at least some of the sampled data 110 and determines a retention model classification 150 using a number of predefined retention models 125. Priority-based retention model selection and criticality-based retention model selection are similar, as the selection determines how much data is retained. The higher the priority or the criticality of the device, the higher the retention of data. For a single IoT device, for example, based on the criticality of the IoT device, different data and retention models 310 can be selected. For example, if there are sufficient computational resources available, a GMM model can be fit as the data model for a device of high criticality, but also retain the complete time series using a complete retention model 310-*m*, and use the complete time series for analysis for a critical device. For a device of low criticality, on the other hand, a more simple parametric model could be employed as the data model, and only the descriptive statistics of the data can be retained using a lossy retention model 310-1 (with all other measurements being discarded).

The priority of data for retention can also be defined a function of time. As data ages, the space required for storage can be reduced, for example, by migrating to a subsample retention model 310-2 or a lossy retention model 310-1 over time. Sample and lossy retention models 310-1, 310-2 can be applied to old data produced by a critical sensor or an IoT device as a way of aging and reducing the cost and space consumption due to complete retention.

Data life cycle rules can optionally be used by the retention model classifier 140 of FIG. 1 to automatically control the retention model 310 used as a function of data age. For example, a rule can dictate that the complete model 310-*m* is used for data produced by certain IoT devices in the last 24 hours. This might be necessary, for example, to support IoT applications that need to visualize the real-time stream of data being collected from devices. Data older than 24 hours, but within the last week (or another predefined period of time), could be retained using the subsample retention model 310-2 with a defined sampling frequency. Data older than a week (or another predefined period of time) could be retained using the lossy model 310-1.

Data Models Used for Caching and Paging

A DRAM (dynamic random-access memory) memory resource, for example, is a limited resource and one or more embodiments of the disclosure use the distributions or other representations for a paging strategy and/or an eviction strategy. The data is kept in memory until a representation 130 of the data is derived. For a parametric model 210-1, for example, the PDF can be used for eviction, as needed. The eviction decision can depend on the use case. For example, if it is necessary to keep outliers in memory for analysis, then the PDF (or another representation) can indicate if the values are in the tails of the distribution and those can be kept for analysis, while values that are in the bulk of the PDF (or another representation) can be discarded (e.g., erased or stored to disk). Quartile ranges also can be used for guidance on whether to keep data in memory, to evict the data, or completely forget some values. The decision is use case dependent, but the distributions or other representations are used to guide if the value should be kept or evicted.

The distributions or other representations can also be used in some embodiments to predict paging misses and to optimize the resident memory better. Depending on the policy, the LRU (Least Recently Used) algorithm can be replaced and the PDF (or another representation) can be used to decide what to evict and what to keep in resident memory. It is noted that the distribution and policy mechanisms can be combined into one mechanism. For example, data can be evicted that is likely (according to the PDF, or another representation) because likely events do not need to be processed when the goal of the analysis is to do anomaly detection. In this case, data generated by unlikely events are kept in memory, and frequent data generated by likely events will be evicted.

In some embodiments, the PDF or another representation can be employed to organize the resident memory as well, and use the regions of the PDF or another representation to segment the memory accordingly and to assign sizes of different memory segments according to the PDF or other representation.

Figure 4:
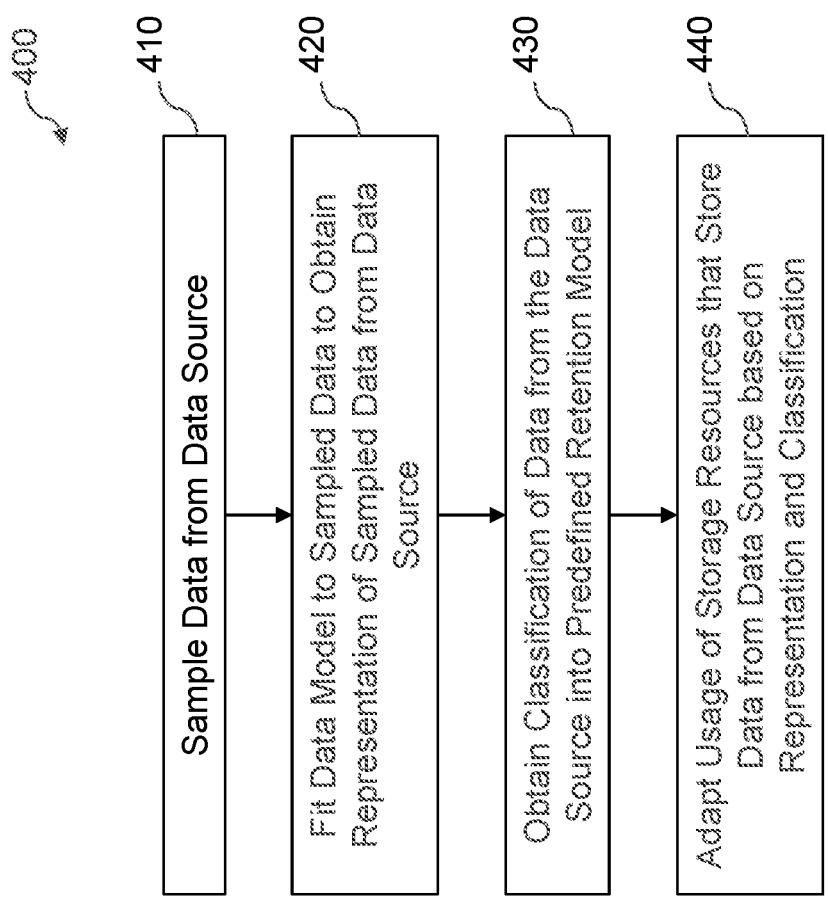
FIG. 4 is a flow chart illustrating an exemplary implementation of an adaptive storage resource usage process, according to one embodiment of the disclosure.

FIG. 4 is a flow chart illustrating an exemplary implementation of an adaptive storage resource usage process 400, according to one embodiment of the disclosure. As shown in FIG. 4, the exemplary adaptive storage resource usage process 400 initially samples data from at least one data source during step 410. Thereafter, at least one data model is fit to the sampled data during step 420 to obtain a representation of the sampled data from the at least one data source. The exemplary adaptive storage resource usage process 400 then obtains a classification of data from the at least one data source during step 430 into one of a plurality of predefined retention models. Finally, a usage of one or more storage resources that store the data from the at least one data source is adapted during step 440 based on the representation and the classification.

Network of Sensors and IoT Devices

Consider a sensor network in which sensors are of different (not necessarily distinct) criticalities. Sensor criticality can be established or estimated based on, for example, a location of the sensor or the criticality of the device(s) monitored by the sensor. Assume that the sensor data is directed to a central location for processing, storage, and retention. Then, in some embodiments, the pager or storage retention algorithm can be priority driven instead of LRU driven. In this case, aging of data associated with low priority sensors by the storage resource adaptation module 160 can be faster than aging of data associated with high priority sensors. If the capacity of the system is reached, then low priority and criticality data can be discarded by the storage resource adaptation module 160. Implementing such a system can be done by allocating memory and storage resources in a manner that is proportional to the criticalities. Low and high priority data will be provisioned with a low and high amount of storage, respectively.

Tradeoffs in Reducing Model Complexity

GMM Error Rate, Lower Complexity Model and Lower Computational Cost

Gaussian Mixture Models with multiple components are powerful and will have a lower rate. In some cases, however, it might be computationally efficient to fit and use only a GMM model with two components, instead of a model with five components, for example. One or more aspects of the disclosure recognize that use of a smaller number of components for modeling will reduce the time to find a "reasonable" model. Thus, a higher error rate can optionally be traded off for a lower computational time.

Grouping Sensor Using PDF Similarity

In a further variation, the model complexity can optionally be reduced by grouping sensors with similar PDFs into one group and using one PDF to describe the group of sensors. In this manner, storage requirements can be reduced and one sample or one subsample of the data can be used instead of N independent samples for each of the N sensors separately to generate the PDF.

Among other benefits, the disclosed adaptive storage resource usage techniques allow IoT devices and the data generated by such IoT devices to be better managed, and more efficiently maintained. The disclosed techniques for adaptive storage resource usage are particularly important for resource-constrained environments, such as IoT edge gateway devices. There is a need for IoT edge gateway devices to retain data and perform analysis at the edge because:

- edge gateway devices may be deployed in remote/air-gapped environments in which they are disconnected from the Internet and cannot rely on a cloud service to receive the data; and
- edge gateway devices need to detect problems and also quickly remediate such problems (for example, an IoT device may be misbehaving and the edge gateway can immediately send a control sequence to shut down the misbehaving IoT device).

One or more embodiments of the disclosure provide improved methods, apparatus and computer program products for adaptive storage resource usage. The foregoing applications and associated embodiments should be considered as illustrative only, and numerous other embodiments can be configured using the techniques disclosed herein, in a wide variety of different applications.

It should also be understood that the disclosed adaptive storage resource usage techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for adaptive storage resource usage may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based adaptive storage resource usage engine, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based adaptive storage resource usage platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
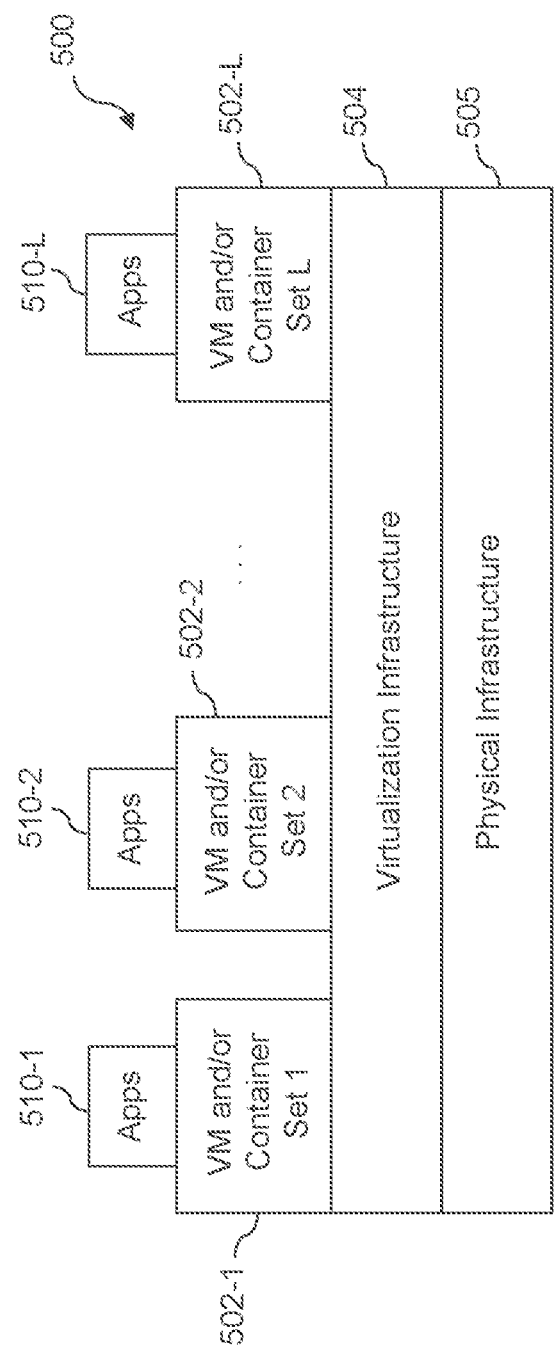
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of an information processing system. The cloud infrastructure 500 comprises multiple virtual machines (VMs) and/or container sets 502-1, 502-2, ... 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, ... 510-L running on respective ones of the VMs/container sets 502-1, 502-2, ... 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide adaptive storage resource usage functionality of the type described above for one or more processes running on a given one of the VMs. For example, each of the VMs can implement adaptive storage resource usage control logic and associated storage resource adaptation for providing adaptive storage resource usage functionality for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide adaptive storage resource usage functionality of the type described above for one or more processes running on different ones of the containers. For example, a container host device supporting multiple containers of one or more container sets can implement one or more instances of adaptive storage resource usage control logic and associated storage resource adaptation for providing adaptive storage resource usage functionality.

As is apparent from the above, one or more of the processing modules or other components of the information processing system may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, ... 602-K, which communicate with one another over a network 604. The network 604 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an application specific integrated circuit (ASIC), a field programmable gate array (FPGA) or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
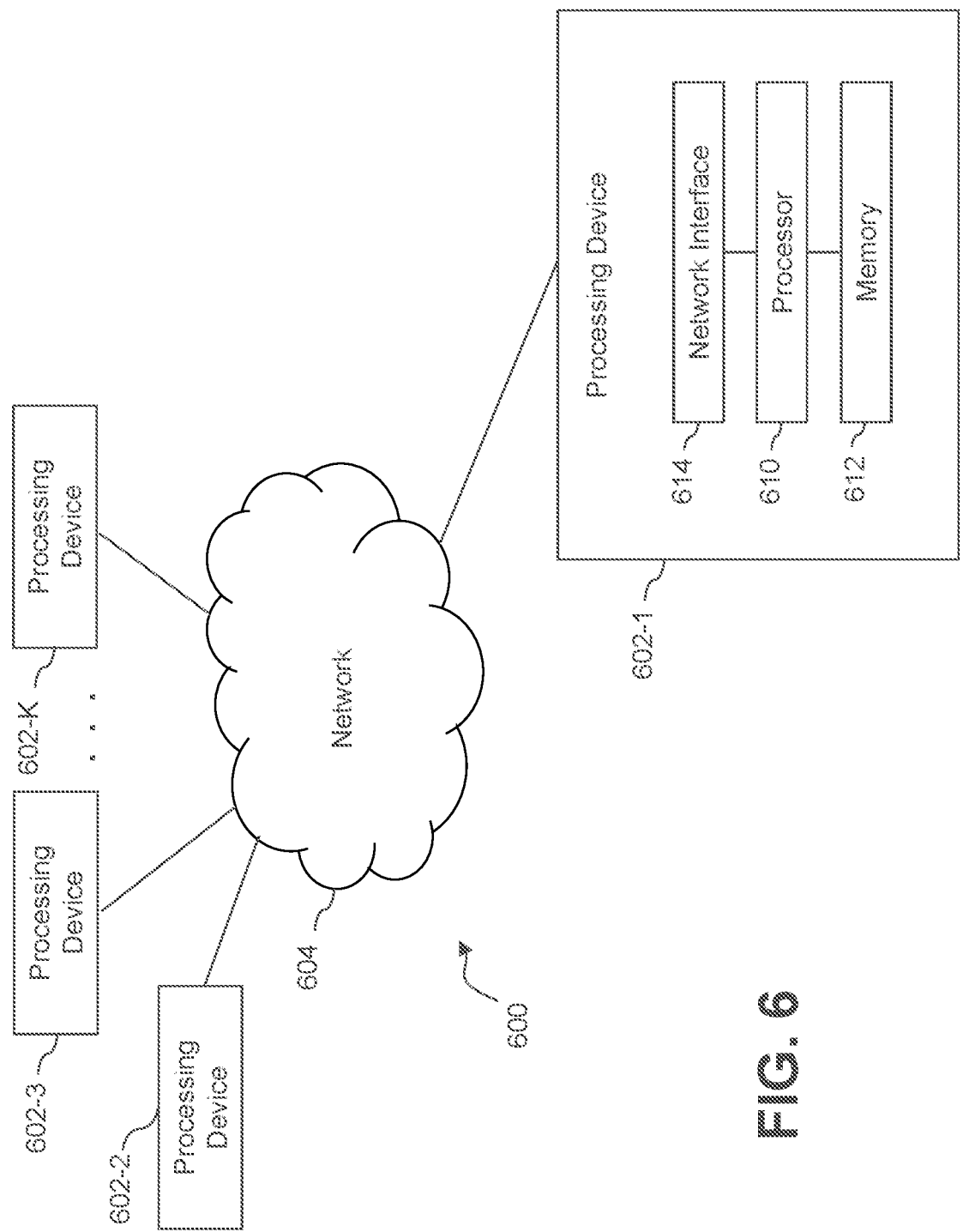
FIG. 6 illustrates another exemplary processing platform that may be used to implement at least a portion of one or more embodiments of the disclosure.

Multiple elements of an information processing system may be collectively implemented on a common processing platform of the type shown in FIG. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining sampled data that was generated by sampling source data from at least one data source;
obtaining a plurality of predefined retention models, wherein each of the predefined retention models specifies a different amount of retained data that is to be stored in the one or more storage resources, for at least some of the source data from the at least one data source;
fitting at least one data model to at least some of the obtained sampled data to obtain a representation of the obtained sampled data from the at least one data source;
determining, by a processor-based retention model classifier, in response to the obtaining the sampled data, an assignment of at least some of the obtained sampled data from the at least one data source to one of the plurality of predefined retention models, wherein the assignment, by the processor-based retention model classifier, to the one predefined retention model is based at least in part on one or more characteristics of the at least one data source that provides the sampled data;
storing at least a portion, corresponding to the amount of the retained data specified by the one predefined retention model, of the representation of the obtained sampled data from the at least one data source in the one or more storage resources based at least in part on the assignment to the one predefined retention model of the plurality of predefined retention models, wherein the determining is performed prior to the storing of the at least the portion of the representation of the obtained sampled data in the one or more storage resources; and
automatically adapting, by a processor-based storage resource adaptation module, using one or more resource adaptation commands sent to one or more of the storage resources, a usage of the one or more storage resources that store the retained data from the at least one data source based at least in part on the representation and the assignment to the one predefined retention model of the plurality of predefined retention models, wherein the automatically adapting the usage of the one or more storage resources comprises automatically receiving, by the processor-based storage resource adaptation module, subsequent to the storing, from the processor-based retention model classifier, an automatic selection of a different one of the plurality of predefined retention models than the one predefined retention model, wherein the automatic selection is based at least in part on: (i) one or more data life cycle rules and (ii) an age of the obtained sampled data from the at least one data source, wherein the different predefined retention model specifies a different amount of retained data than the one predefined retention model, and wherein the processor-based storage resource adaptation module automatically removes, in response to the automatic selection, at least a portion of the amount of the retained data specified by the one predefined retention model from at least one of the one or more storage resources;
wherein the method is performed by at least one processing device comprising a processor coupled to a memory.

2. The method of claim 1, wherein the at least one data model comprises one or more of a parametric model, a non-parametric model, a descriptive statistics model, a time series model, decision trees and an ensemble of decision trees.

3. The method of claim 2, wherein the fitting of the parametric model to at least some of the obtained sampled data comprises representing the obtained sampled data using a probability distribution function and determining one or more parameters of the probability distribution function.

4. The method of claim 2, wherein the fitting of the non-parametric model to at least some of the obtained sampled data comprises representing the obtained sampled data using one or more of a Gaussian Mixture model, a Gaussian Mixture model that captures temporal variance, and a Kernel Density Estimation model.

5. The method of claim 2, wherein the fitting of the descriptive statistics model to at least some of the obtained sampled data comprises recording one or more of predefined summary statistics of the representation of the obtained sampled data and a time stamp of the first and last recorded value in the sampled data.

6. The method of claim 2, wherein the fitting of the time series model to at least some of the obtained sampled data comprises recording the source data and corresponding time stamps generated by the at least one data source.

7. The method of claim 2, further comprising identifying a distribution drift based at least in part on at least one density function of one or more of the parametric model and the non-parametric model; and performing the fitting when a distribution drift is identified.

8. The method of claim 1, further comprising grouping a plurality of data sources into a group and representing the group using one data model.

9. The method of claim 1, wherein the automatically adapting the usage of the one or more storage resources further comprises one or more of (i) evicting data from a cache based at least in part on the representation; (ii) moving the retained data from the at least one data source to a different storage tier; and (iii) determining an amount of time to store the retained data from the at least one data source.

10. The method of claim 1, wherein the plurality of predefined retention models comprises one or more of a lossy retention model that stores a type of a probability density function, one or more parameters of the probability density function and one or more summary statistics; a subsample retention model that stores a type of a probability density function, one or more parameters of the probability density function, a time interval, one or more summary statistics and a subsample of the source data from the at least one data source; and a complete retention model that stores a type of a probability density function, one or more parameters of the probability density function, the source data from the at least one data source, and a time interval.

11. The method of claim 1, wherein the one or more characteristics of the at least one data source comprise one or more of a priority and a criticality of the at least one data source.

12. An apparatus comprising:
at least one processing device comprising a processor coupled to a memory;
the at least one processing device being configured to implement the following steps:
obtaining sampled data that was generated by sampling source data from at least one data source;
obtaining a plurality of predefined retention models, wherein each of the predefined retention models specifies a different amount of retained data that is to be stored in one or more storage resources, for at least some of the source data from the at least one data source;
fitting at least one data model to at least some of the obtained sampled data to obtain a representation of the obtained sampled data from the at least one data source;
determining, by a processor-based retention model classifier, in response to the obtaining the sampled data, an assignment of at least some of the obtained sampled data from the at least one data source to one of the plurality of predefined retention models, wherein the assignment, by the processor-based retention model classifier, to the one predefined retention model is based at least in part on one or more characteristics of the at least one data source that provides the sampled data;
storing at least a portion, corresponding to the amount of the retained data specified by the one predefined retention model, of the representation of the obtained sampled data from the at least one data source in the one or more storage resources based at least in part on the assignment to the one predefined retention model of the plurality of predefined retention models, wherein the determining is performed prior to the storing of the at least the portion of the representation of the obtained sampled data in the one or more storage resources; and
automatically adapting, by a processor-based storage resource adaptation module, using one or more resource adaptation commands sent to one or more of the storage resources, a usage of the one or more storage resources that store the retained data from the at least one data source based at least in part on the representation and the assignment to the one predefined retention model of the plurality of predefined retention models, wherein the automatically adapting the usage of the one or more storage resources comprises automatically receiving, by the processor-based storage resource adaptation module, subsequent to the storing, from the processor-based retention model classifier, an automatic selection of a different one of the plurality of predefined retention models than the one predefined retention model, wherein the automatic selection is based at least in part on: (i) one or more data life cycle rules and (ii) an age of the obtained sampled data from the at least one data source, wherein the different predefined retention model specifies a different amount of retained data than the one predefined retention model, and wherein the processor-based storage resource adaptation module automatically removes, in response to the automatic selection, at least a portion of the amount of the retained data specified by the one predefined retention model from at least one of the one or more storage resources.

13. The apparatus of claim 12, wherein the at least one data model comprises one or more of a parametric model, a non-parametric model, a descriptive statistics model, a time series model, decision trees and an ensemble of decision trees.

14. The apparatus of claim 12, further comprising grouping a plurality of data sources into a group and representing the group using one data model.

15. The apparatus of claim 12, wherein the automatically adapting the usage of the one or more storage resources further comprises one or more of (i) evicting data from a cache based at least in part on the representation; (ii) moving the retained data from the at least one data source to a different storage tier; and (iii) determining an amount of time to store the retained data from the at least one data source.

16. The apparatus of claim 12, wherein the one or more characteristics of the at least one data source comprise one or more of a priority and a criticality of the at least one data source.

17. A non-transitory processor-readable storage medium having stored therein program code of one or more software programs, wherein the program code when executed by at least one processing device causes the at least one processing device to perform the following steps:
obtaining sampled data that was generated by sampling source data from at least one data source;

obtaining a plurality of predefined retention models, wherein each of the predefined retention models specifies a different amount of retained data that is to be stored in one or more storage resources, for at least some of the source data from the at least one data source;

fitting at least one data model to at least some of the obtained sampled data to obtain a representation of the obtained sampled data from the at least one data source;

determining, by a processor-based retention model classifier, in response to the obtaining the sampled data, an assignment of at least some of the obtained sampled data from the at least one data source to one of the plurality of predefined retention models, wherein the assignment, by the processor-based retention model classifier, to the one predefined retention model is based at least in part on one or more characteristics of the at least one data source that provides the sampled data;

storing at least a portion, corresponding to the amount of the retained data specified by the one predefined retention model, of the representation of the obtained sampled data from the at least one data source in the one or more storage resources based at least in part on the assignment to the one predefined retention model of the plurality of predefined retention models, wherein the determining is performed prior to the storing of the at least the portion of the representation of the obtained sampled data in the one or more storage resources; and automatically adapting, by a processor-based storage resource adaptation module, using one or more resource adaptation commands sent to one or more of the storage resources, a usage of the one or more storage resources that store the retained data from the at least one data source based at least in part on the representation and the assignment to the one predefined retention model of the plurality of predefined retention models, wherein the automatically adapting the usage of the one or more storage resources comprises automatically receiving, by the processor-based storage resource adaptation module, subsequent to the storing, from the processor-based retention model classifier, an automatic selection of a different one of the plurality of predefined retention models than the one predefined retention model, wherein the automatic selection is based at least in part on: (1) one or more data life cycle rules and (ii) an age of the obtained sampled data from the at least one data source, wherein the different predefined retention model specifies a different amount of retained data than the one predefined retention model, and wherein the processor-based storage resource adaptation module automatically removes, in response to the automatic selection, at least a portion of the amount of the retained data specified by the one predefined retention model from at least one of the one or more storage resources.

18. The non-transitory processor-readable storage medium of claim 17, wherein the at least one data model comprises one or more of a parametric model, a non-parametric model, a descriptive statistics model, a time series model, decision trees and an ensemble of decision trees.

19. The non-transitory processor-readable storage medium of claim 17, wherein the automatically adapting the usage of the one or more storage resources further comprises one or more of (i) evicting data from a cache based at least in part on the representation; (ii) moving the retained data from the at least one data source to a different storage tier; and (iii) determining an amount of time to store the retained data from the at least one data source.

20. The non-transitory processor-readable storage medium of claim 17, wherein the one or more characteristics of the at least one data source comprise one or more of a priority and a criticality of the at least one data source.

* * * * *